United States Patent
Birman et al.

(10) Patent No.: US 9,677,918 B2
(45) Date of Patent: Jun. 13, 2017

(54) LIGHT PROPAGATION AND EVEN DISTRIBUTION USING AIR CHANNELS

(71) Applicant: Continental Automotive Systems, Inc., Auburn Hills, MI (US)

(72) Inventors: Vyacheslav B Birman, Auburn Hills, MI (US); Richard Sanders, Clarkston, MI (US); Michael J Hartmeyer, West Bloomfield, MI (US)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 14/507,174

(22) Filed: Oct. 6, 2014

(65) Prior Publication Data

US 2016/0096472 A1  Apr. 7, 2016

(51) Int. Cl.
*G01D 11/28* (2006.01)

(52) U.S. Cl.
CPC .................................. *G01D 11/28* (2013.01)

(58) Field of Classification Search
CPC ...... G01D 11/28; G01D 13/265; B60K 37/02; B60K 2350/203; B60K 2350/1064; B60K 2350/2069; B60K 2350/408; G09F 2013/0422; G09F 2013/044; G09F 2013/145

See application file for complete search history.

(56) References Cited

U.S. PATENT DOCUMENTS

| | | | |
|---|---|---|---|
| 7,093,948 B2 | 8/2006 | Fong | |
| 7,207,117 B1 | 4/2007 | Cook | |
| 7,607,808 B2 | 10/2009 | Birman et al. | |
| 8,016,441 B2 | 9/2011 | Birman et al. | |
| 2003/0201451 A1* | 10/2003 | Suehiro | H01L 33/507 257/98 |
| 2005/0002171 A1 | 1/2005 | Tanguy et al. | |
| 2005/0281040 A1* | 12/2005 | Birman | B60Q 3/044 362/487 |
| 2006/0212162 A1* | 9/2006 | Kato | B60K 37/02 700/213 |

* cited by examiner

*Primary Examiner* — Anh Mai
*Assistant Examiner* — Fatima Farokhrooz

(57) ABSTRACT

A light housing for propagating light therethrough is disclosed. The light housing includes a base surface, indented surfaces extending from and connected to the base surface, and roof portions extending from and connected to the base surface. The indented surfaces form openings for light emission through the openings. Each roof portion extends over one of the openings. An instrument cluster assembly for a motor vehicle including the light housing is also disclosed.

20 Claims, 6 Drawing Sheets

LIGHT PROPAGATION AND EVEN DISTRIBUTION USING AIR CHANNELS

FIELD

The present disclosure relates to vehicle instrument panels and clusters, and more specifically to lighting of an instrument cluster in a motor vehicle.

BACKGROUND

Vehicles include instrument panels to communicate information indicative of operation to an operator. For example, motor vehicles may include instrument panels with several gauges and dials that communicate vehicle conditions such as speed, engine rpm, temperature, and oil pressure, among other operational parameters. A pointer is typically provided that rotates about a fixed axis to communicate current values of an operational parameter.

An instrument panel and gauge is a functional element of a vehicle dashboard, but also contributes to the aesthetic appearance and impression of the vehicle. Light guides and multiple LEDS are typically assembled with a housing to distribute light to the face of the instrument cluster. Each LED requires electronics associated with it.

Accordingly, designers are continually seeking different configurations to improve the appearance of the instrument panel, while maintaining the required functionality, without significantly increasing the cost.

SUMMARY

A light housing and instrument cluster assembly are provided that propagate light along air channels to reduce or eliminate the need for extra components to propagate light. The light housing has a surface disposed opposite a light source, which reflects the light along air channels to evenly distribute the light.

In one form, which may be combined with or separate from the other forms disclosed herein, a light housing for propagating light therethrough is provided. The light housing includes a base surface and a plurality of indented surfaces extending from and connected to the base surface. The plurality of indented surfaces form a plurality of openings for light emission through the plurality of openings. A plurality of roof portions extend from the base surface, and the roof portions are connected to the base surface. Each roof portion extends over one opening of the plurality of openings.

In another form, which may be combined with or separate from the other forms disclosed herein, an instrument cluster assembly for providing a display in a motor vehicle is provided. The instrument cluster assembly includes at least one printed circuit having a plurality of light sources connected thereto. A light housing is disposed adjacent to the printed circuit board (or printed circuit boards). The light housing has a base surface and a plurality of indented surfaces extending from and connected to the base surface. The plurality of indented surfaces form a plurality of openings therethrough. A light source of the plurality of light sources is disposed adjacent to each opening. The light housing has a plurality of roof portions extending from and connected to the base surface. Each roof portion extends over one opening of the plurality of openings. An appliqué surface disposed adjacent to the light housing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
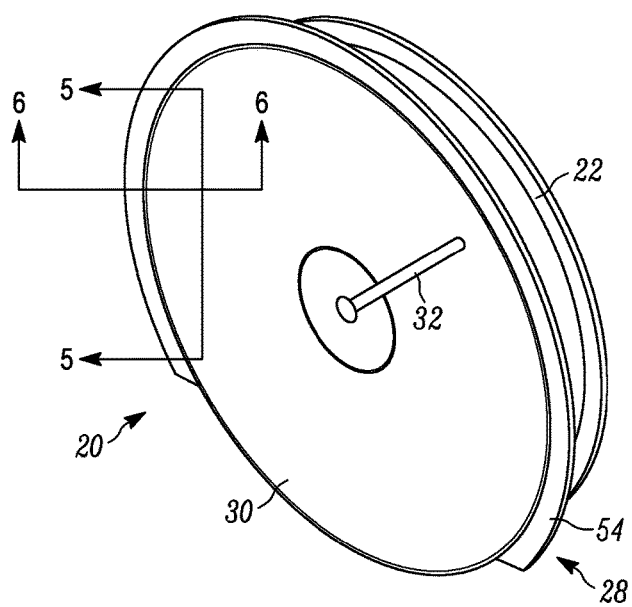
FIG. 1 is a perspective view of an example instrument cluster assembly having a light housing and a appliqué surface, in accordance with the principles of the present disclosure.
Figure 2:
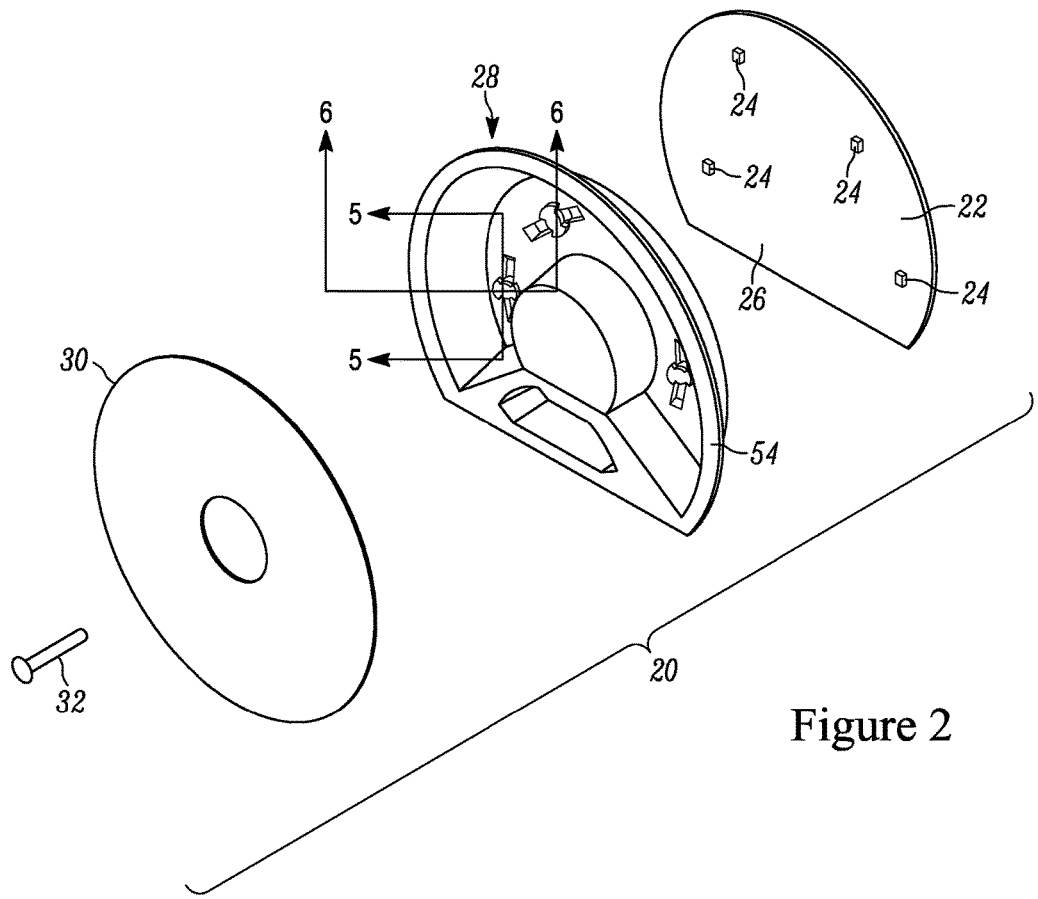
FIG. 2 is an exploded view of the instrument cluster assembly of FIG. 1, according to the principles of the present disclosure.
Figure 3:
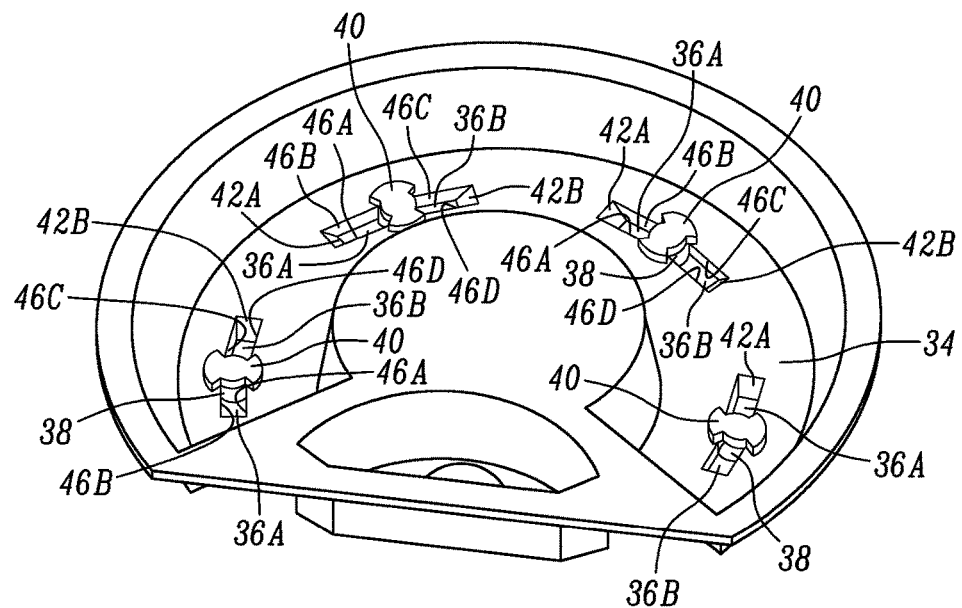
FIG. 3 is a perspective front view of the light housing of the instrument cluster assembly of FIGS. 1-2, in accordance with the principles of the present disclosure.
Figure 4:
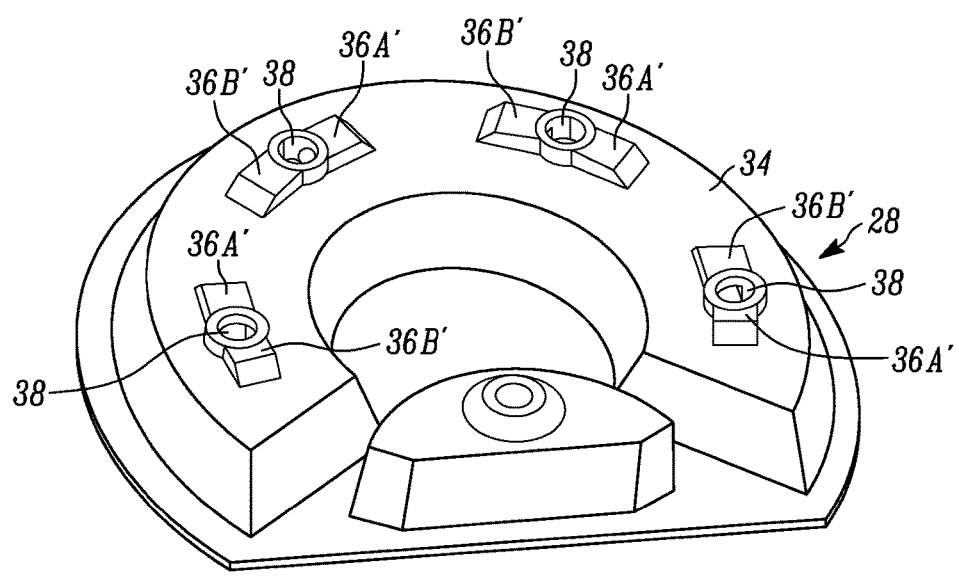
FIG. 4 is a perspective rear view of the light housing shown in FIGS. 1-3, according to the principles of the present disclosure.
Figure 5:
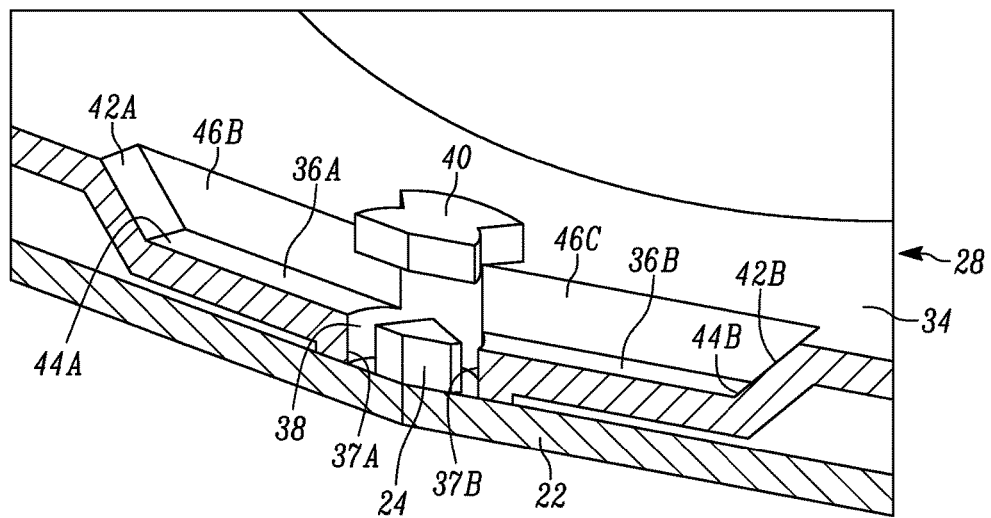
FIG. 5 is a cross-sectional view of a portion of the instrument cluster assembly of FIGS. 1-2, with the appliqué surface omitted, taken along the line 5-5 in FIGS. 1 and 2, in accordance with the principles of the present disclosure.
Figure 6:
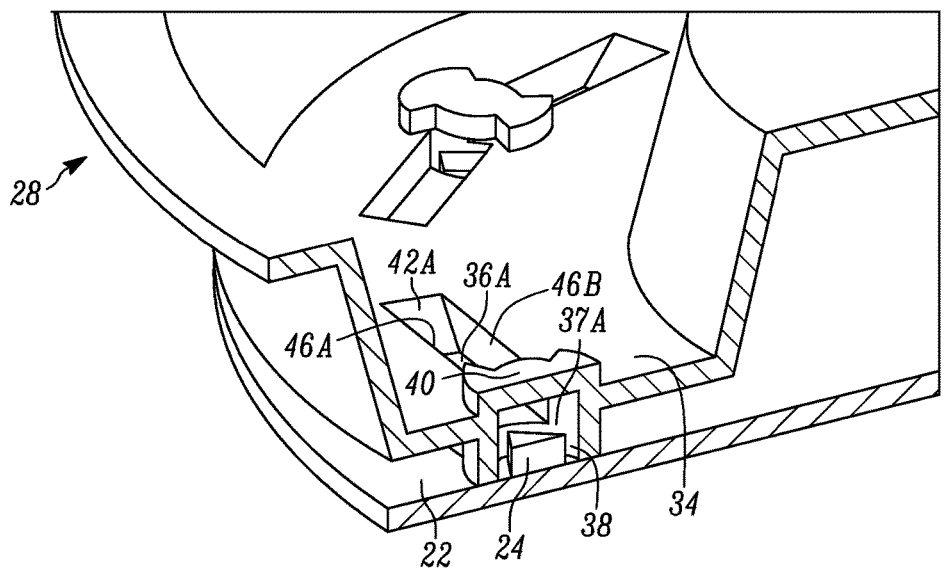
FIG. 6 is a cross-sectional view of a portion of the instrument cluster assembly of FIGS. 1-2, with the appliqué surface omitted, taken along the line 6-6 in FIGS. 1 and 2, in accordance with the principles of the present disclosure.

With reference to FIGS. 1 and 2, an instrument cluster assembly in accordance with the present disclosure is illustrated and generally designated at 20. The instrument cluster assembly 20 may be used in a motor vehicle, for example, to display certain operating parameters to a driver. Information given by the instrument cluster assembly 20 may include, by way of example, tachometer information, vehicle speed information, fuel level information, engine temperature, or any other information that is desired to communicate to the driver of the vehicle.

The instrument cluster assembly 20, in this example, includes one or more printed circuit boards 22 having a plurality of light sources 24 electrically connected to the printed circuit board 24. The light sources 24 may also be mechanically connected to and/or disposed on an outer face 26 of the printed circuit board 22. The light sources 24 may be light-emitting diodes (LED's), by way of example.

A light housing 28 is disposed adjacent to the printed circuit board 22. The specific architecture of the light housing 28 is described in further detail below. An appliqué surface 30 is disposed adjacent to the light housing 28. The appliqué surface 30 may be translucent or partially or fully transparent, by way of example, to allow light from the light sources 24 to shine though the appliqué surface 30. The appliqué surface 30 may include a plurality of tick marks or indicia (not shown) to indicate a parameter of the instrument cluster 20. A pointer 32 may also be included to indicate a certain parameter on the appliqué surface 30.

Referring now to FIGS. 3-8, additional details of the light housing 28 are shown. The light housing 28 has a base surface 34 and one or more indented surfaces 36A, 36B extending from and connected to the base surface 34. Each indented surface 36A, 36B is disposed a distance D from the base surface 34. In this example, the indented surfaces 36A, 36B are parallel to the base surface 34. Back sides of the indented surfaces 36A, 36B are labeled as 36A' and 36B' in FIG. 4.

The indented surfaces 36A, 36B form openings 38 therethrough, adjacent to edges 37A, 37B of the indented surfaces 36A, 36B. The light sources 24 are each disposed adjacent to the one of the openings 38 so that light shines through the openings 38. The light sources 24 may each extend into or through the openings 38 formed in the indented surfaces 36A, 36B.

The light housing 28 has a plurality of roof portions 40 extending from and connected to the base surface 34. Each roof portion 40 extends over an opening 38. Each roof portion 40 also extends over a light source 24. In the illustrated example, the light housing 28 has four roof portions 40, four openings 38, and four light sources 24; however, it should be understood that another number of light sources 24 and associated components on the light housing 28 may be used, without falling beyond the spirit and scope of the present disclosure. For example, three, five, six, or another number of light sources 24 and associated components of the light housing 28 could be used.

In the illustrated example, the light housing 28 also includes inclined surfaces 42A, 42B that connect the indented surfaces 36A, 36B to the base surface 34, respectively. Each inclined surface 42A, 42B connects one indented surface 36A, 36B to the base surface 34. In the illustrated example, each inclined surface 42A, 42B is disposed at an obtuse angle α (labeled in FIG. 7A) with respect to the indented surfaces 36A, 36B.

The indented surfaces 36A, 36B are disposed in pairs, wherein a first indented surface 36A is disposed adjacent to a second indented surface 36B and together, each first indented surface 36A and each second indented surface 36B form one opening 38 therebetween, between their edges 37A, 37B. The inclined surfaces 42A, 42B are also disposed in pairs, with a first inclined surface 42A disposed at an end 44A, and connected to the end 44A, of each first indented surface 42A and a second inclined surface 42B disposed at an end 44B, and connected to the end 44B, of each second indented surface 42B.

The light housing 28 also has a plurality of side surfaces 46A, 46B, 46C, 46D. Each side surface 46A, 46B, 46C, 46D further connects an indented surface 36A, 36B to the base surface 34. More particularly, the light housing 28 has a plurality of first side surfaces 46A, a plurality of second side surfaces 46B, a plurality of third side surfaces 46C, and a plurality of fourth side surfaces 46D. Each first side surface 46A and each second side surface 46B connect a first indented surface 36A of the plurality of first indented surfaces 36A to the base surface 34. Each third side surface 46C and each fourth side surface 46D connect a second indented surface 36B of the plurality of second indented surfaces 36B to the base surface 34.

The side surfaces 46A-46D, the inclined surfaces 42A, 42B, the indented surfaces 36A, 36B, and the roof portions 40 form a plurality of air channels configured to propagate light from the light sources 24 through the light housing 28. More particularly, each first side surface 46A, each second side surface 46B, each first indented surface 36A, and each first inclined surface 42A, together with a roof portion 40, form a first air channel configured to propagate light through the light housing 28. Further, each third side surface 46C, each fourth side surface 46D, each second indented surface 36B, and each second inclined surface 42B, together with a roof portion 40, form a second air channel configured to propagate light through the light housing 28. As shown in the Figures, a single roof portion 40 may form part of both a first air channel and a second air channel.

Figure 8:
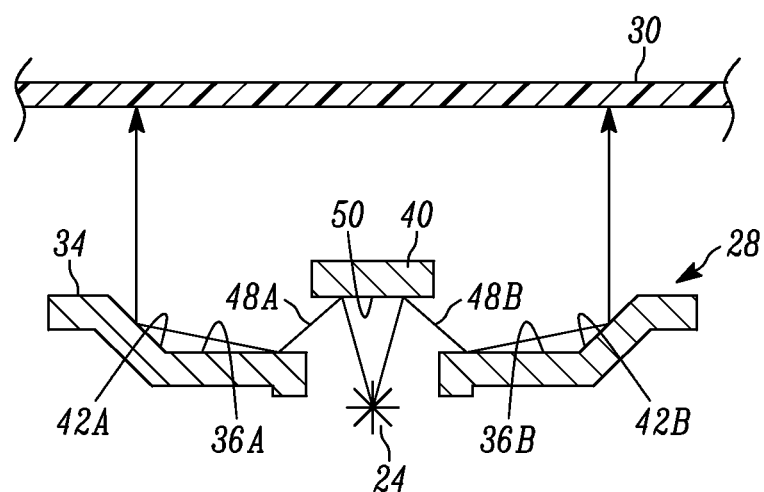
FIG. 8 is a schematic cross-sectional view of the light housing and appliqué surface shown in FIGS. 1-2 showing light rays propagated through the light housing, taken along the line 5-5 in FIGS. 1-2, according to the principles of the present disclosure.

Therefore, referring to FIG. 8, when light rays 48A, 48B are emitted from a light source 24, the light rays 48A, 48B are reflected off of an undersurface 50 of the roof portion 40, toward the indented surfaces 36A, 36B, where the light rays 48A, 48B are further reflected from the indented surfaces 36A, 36B onto the inclined surfaces 42A, 42B. The inclined surfaces 42A, 42B then reflect the light rays 48A, 48B away from the light housing 28 to the appliqué surface 30. The light rays 48A, 48B may then be seen through the appliqué surface 30.

Each roof portion 40 may comprise a generally flat reflective surface 50, and each inclined surface 42A, 42B and each indented surface 36A, 36B may comprise or be a generally flat, reflective surface. In the alternative, the reflective surfaces 50, 42A, 42B, 36A, 36B may have other non-flat shapes, such as curved shapes (conical, spherical, cylindrical, etc.).

Thus, the light rays 48A, 48B are reflected off of at least one surface and are propagated along the air channels defined by the side surfaces 46A-46D, the inclined surfaces 42A, 42B, the indented surfaces 36A, 36B, and the roof portions 40. The light rays 48A, 48B need not necessarily be reflected off of every surface shown in FIG. 8. For example, some light rays may reflect only off of one surface or two surfaces of the roof portion 40, the indented surfaces 36A, 36B, the inclined surfaces 42A, 42B, or even the side surfaces 46A-46D. Light propagates along the air channels until it is substantially evenly distributed. Areas of low luminance are increased, and areas of high luminance are decreased. Therefore, in some variations, transparent or translucent light guides can be eliminated as a conduit for propagating the light rays.

Figure 7:
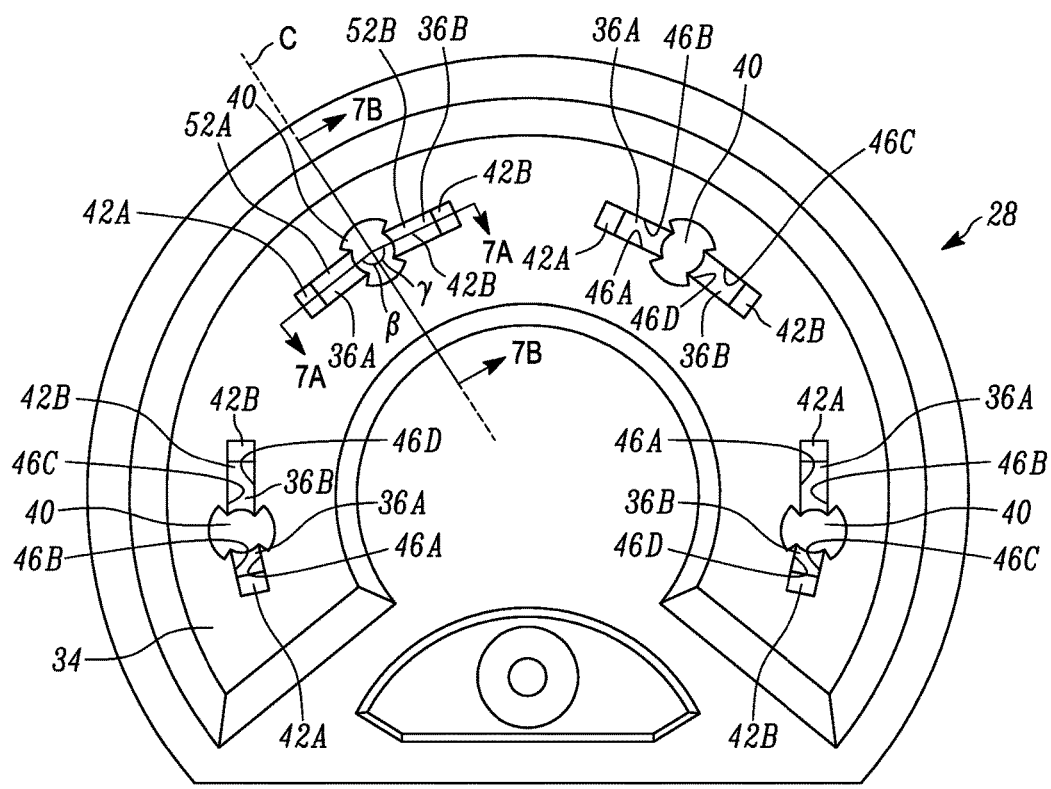
FIG. 7 is a plan view of the light housing shown in FIGS. 1-6, according to the principles of the present disclosure.
Figure 7A:
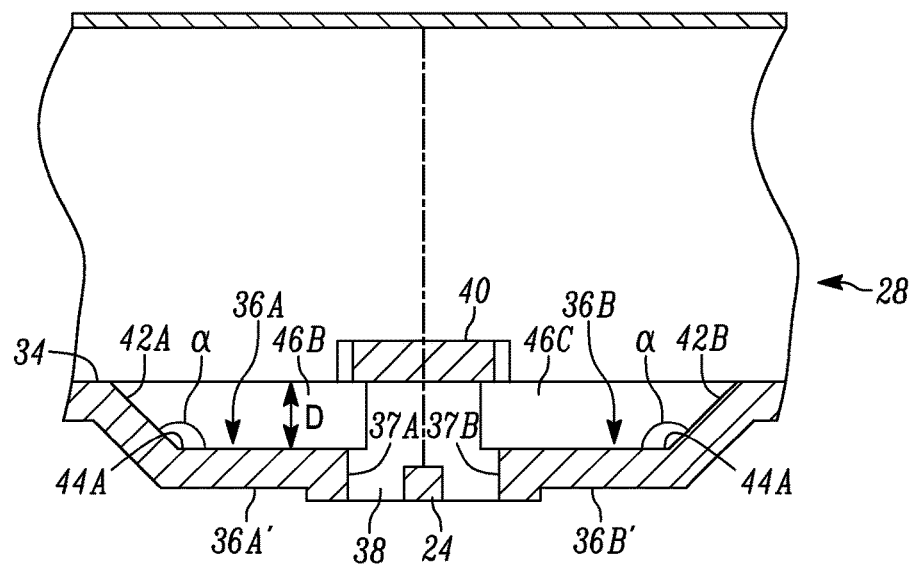
FIG. 7A is a cross-sectional view of the light housing shown in FIGS. 1-7, taken along the angled line 7A-7A in FIG. 7, in accordance with the principles of the present disclosure.
Figure 7B:
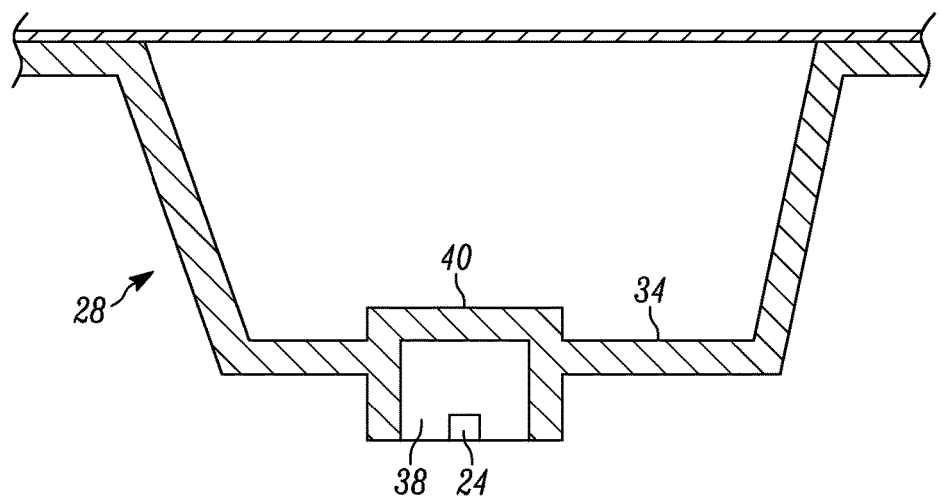
FIG. 7B is a cross-sectional view of the light housing shown in FIGS. 1-7, taken along the line 7B-7B in FIG. 7, in accordance with the principles of the present disclosure.

Referring to FIG. 7, in some variations, each opening 30 and roof portion 40 defines a center line C extending therethrough, and each first air channel 52A extends a first acute angle β from the center line C. Further, each second air channel 52B extends a second acute angle γ from the center line C. Thus, the first and second channels 52A, 52B may be nonparallel to each other. Likewise, the first side walls 46A and the fourth side walls 46B are nonparallel to each other, and the second side walls 46B and the third side walls 46C are nonparallel to each other.

On the other hand, the first and second side walls 46A, 46B that form one first air channel 52A may be parallel and disposed opposite one another, the first and second side walls 46A, 46B extending at the angle β from the center line C; and likewise, the third and fourth side walls 46C, 46D that form one second air channel 52B may be parallel and disposed opposite one another, the third and fourth side walls 46C, 46D extending at the angle γ from the center line C.

The light housing 28 may include at least one raised surface 54 that is connected to and/or in contact with the appliqué surface 30. Furthermore, the light housing 28 may be formed of an opaque material that reflects the light rays 48A, 48B. For example, polypropylene or any desirable plastic could be used.

It is further understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. A light housing for propagating light therethrough, the light housing comprising:
    a base surface;
    a plurality of indented surfaces extending from and connected to the base surface, the plurality of indented surfaces forming a plurality of openings for light emission through the plurality of openings; and
    a plurality of roof portions extending from and connected to the base surface, each roof portion extending over one opening of the plurality of openings.

2. The light housing of claim 1, each indented surface of the plurality of indented surfaces being parallel to the base surface.

3. The light housing of claim 2, wherein the base surface, the plurality of indented surfaces, and the plurality of roof portions are formed of an opaque material.

4. The light housing of claim 3, further comprising a plurality of inclined surfaces, each inclined surface of the plurality of inclined surfaces connecting an indented surface of the plurality of indented surfaces to the base surface, each inclined surface being disposed at an obtuse angle with respect to an indented surface of the plurality of indented surfaces.

5. The light housing of claim 4, further comprising a plurality of side surfaces, each side surface further connecting an indented surface of the plurality of indented surfaces to the base surface.

6. The light housing of claim 5, wherein the plurality of side surfaces, the plurality of inclined surfaces, the plurality of indented surfaces and the plurality of roof portions form a plurality of air channels configured to propagate light through the light housing.

7. The light housing of claim 6, wherein the plurality of side surfaces includes a plurality of first side surfaces, a plurality of second side surfaces, a plurality of third side surfaces, and a plurality of fourth side surfaces,
    wherein the plurality of indented surfaces includes a plurality of first indented surfaces and a plurality of second indented surfaces, each first indented surface being disposed adjacent to a second indented surface and forming one opening of the plurality of openings therebetween,
    wherein each first side surface and each second side surface connect a first indented surface of the plurality of first indented surfaces to the base surface, and each third side surface and each fourth side surface connect a second indented surface of the plurality of second indented surfaces to the base surface, the plurality of air channels comprising a plurality of first air channels and a plurality of second air channels, and
    wherein each first side surface, each second side surface, each first indented surface, and each first inclined surface form a first air channel of the plurality of first air channels, and wherein each third side surface, each fourth side surface, each second indented surface, and each second inclined surface form a second air channel of the plurality of second air channels.

8. The light housing of claim 7, wherein each roof portion defines a center line extending therethrough, each first air channel extending a first acute angle from the center line of a roof portion of the plurality of roof portions, each second air channel extending a second acute angle from the center line of a roof portion of the plurality of roof portions, the first and second air channels being nonparallel to each other.

9. The light housing of claim 8, wherein each roof portion comprises a generally flat reflective surface and each inclined surface is generally flat and reflective.

10. An instrument cluster assembly for providing a display in a motor vehicle, the instrument cluster assembly comprising:
    at least one printed circuit having a plurality of light sources connected thereto;
    a light housing disposed adjacent to the at least one printed circuit board, the light housing having a base surface and a plurality of indented surfaces extending from and connected to the base surface, the plurality of indented surfaces forming a plurality of openings therethrough, a light source of the plurality of light sources being disposed adjacent to each opening, the light housing having a plurality of roof portions extending from and connected to the base surface, each roof portion extending over one opening of the plurality of openings; and An appliqué surface disposed adjacent to the light housing.

11. The instrument cluster assembly of claim 10, each indented surface of the plurality of indented surfaces being parallel to the base surface.

12. The instrument cluster assembly of claim 11, wherein the light housing is formed of an opaque material.

13. The instrument cluster assembly of claim 12, the light housing further comprising a plurality of inclined surfaces, each inclined surface of the plurality of inclined surfaces connecting an indented surface of the plurality of indented surfaces to the base surface, the inclined surfaces being disposed at an obtuse angle with respect to the indented surfaces.

14. The instrument cluster assembly of claim 13, the light housing further comprising a plurality of side surfaces, each side surface further connecting an indented surface of the plurality of indented surfaces to the base surface.

15. The instrument cluster assembly of claim 14, wherein the plurality of side surfaces, the plurality of inclined surfaces, the plurality of indented surfaces and the plurality of roof portions form a plurality of air channels configured to propagate light from the plurality of light sources through the light housing.

16. The instrument cluster assembly of claim 15, wherein the plurality of indented surfaces includes a plurality of first indented surfaces and a plurality of second indented surfaces, each first indented surface being disposed adjacent to a second indented surface and forming one opening of the plurality of openings therebetween.

17. The instrument cluster assembly of claim 16, wherein the plurality of side surfaces includes a plurality of first side surfaces, a plurality of second side surfaces, a plurality of third side surfaces, and a plurality of fourth side surfaces, each first side surface and each second side surface connecting a first indented surface of the plurality of first indented surfaces to the base surface, and each third side surface and each fourth side surface connecting a second indented surface of the plurality of second indented surfaces to the base surface, the plurality of air channels comprising a plurality of first air channels and a plurality of second air channels, wherein each first side surface, each second side surface, each first indented surface, and each first inclined surface form a first air channel of the plurality of first air channels, and wherein each third side surface, each fourth side surface, each second indented surface, and each second inclined surface form a second air channel of the plurality of second air channels.

18. The instrument cluster assembly of claim 17, wherein each roof portion of the plurality of roof portions defines a center line extending therethrough, each first air channel extending a first acute angle from the center line of a roof portion of the plurality of roof portions, each second air channel extending a second acute angle from the center line of a roof portion of the plurality of roof portions, the first and second air channels being nonparallel to each other.

19. The instrument cluster assembly of claim 18, wherein each roof portion comprises a generally flat reflective surface and each inclined surface is generally flat and reflective.

20. The instrument cluster assembly of claim 19, wherein the light housing has a raised portion that contacts the appliqué surface.

* * * * *